United States Patent
Hill et al.

(10) Patent No.: US 9,435,902 B2
(45) Date of Patent: Sep. 6, 2016

(54) WIDE AREA SEISMIC DETECTION

(75) Inventors: David John Hill, Weymouth (GB);
Magnus McEwen-King, Farnham (GB)

(73) Assignee: OPTASENSE HOLDINGS LTD. (GB)

(*) Notice: Subject to any disclaimer, the term of this patent is extended or adjusted under 35 U.S.C. 154(b) by 543 days.

(21) Appl. No.: 12/883,755

(22) Filed: Sep. 16, 2010

(65) Prior Publication Data
US 2011/0069302 A1    Mar. 24, 2011

(30) Foreign Application Priority Data
Sep. 18, 2009 (GB) .................... 0916407.0

(51) Int. Cl.
| G01V 1/00 | (2006.01) |
| G01V 1/18 | (2006.01) |
| G01D 5/353 | (2006.01) |
| G01H 9/00 | (2006.01) |

(52) U.S. Cl.
CPC ........... *G01V 1/008* (2013.01); *G01D 5/35361* (2013.01); *G01H 9/004* (2013.01); *G01V 1/001* (2013.01); *G01V 1/003* (2013.01); *G01V 1/186* (2013.01)

(58) Field of Classification Search
None
See application file for complete search history.

(56) References Cited

U.S. PATENT DOCUMENTS

| 3,913,085 | A | * | 10/1975 | Farstad | 367/136 |
| 5,146,521 | A | * | 9/1992 | Hartog | 385/48 |
| 5,698,848 | A | * | 12/1997 | Belk | 250/227.11 |
| 6,208,247 | B1 | * | 3/2001 | Agre et al. | 340/539.19 |
| 6,268,911 | B1 | * | 7/2001 | Tubel et al. | 356/72 |
| 6,374,913 | B1 | * | 4/2002 | Robbins et al. | 166/66 |
| 6,588,266 | B2 | * | 7/2003 | Tubel et al. | 73/152.39 |
| 6,606,186 | B2 | * | 8/2003 | Maas | 359/325 |
| 6,724,319 | B1 | * | 4/2004 | Knaack et al. | 340/854.7 |
| 6,728,165 | B1 | * | 4/2004 | Roscigno et al. | 367/14 |
| 6,826,607 | B1 | * | 11/2004 | Gelvin et al. | 709/224 |
| 6,901,030 | B1 | * | 5/2005 | Owen, IV et al. | 367/124 |
| 6,913,079 | B2 | * | 7/2005 | Tubel | 166/250.01 |
| 6,967,584 | B2 | * | 11/2005 | Maki | 340/657 |
| 7,223,962 | B2 | * | 5/2007 | Fageraas et al. | 250/227.14 |
| 7,646,944 | B2 | * | 1/2010 | Kaplan | 385/12 |
| 8,315,486 | B2 | * | 11/2012 | Pearce et al. | 385/13 |
| 2004/0067002 | A1 | * | 4/2004 | Berg et al. | 385/12 |

(Continued)

FOREIGN PATENT DOCUMENTS

| CN | 101393268 | 3/2009 |
| CN | 101393269 | 3/2009 |

(Continued)

OTHER PUBLICATIONS

Kirkendall, "Distributed Acoustic and Seismic Sensing", Optical Fiber Communication Conference and Exposition National Fiber Optic Engineers Conference, (OFCNFOEC 2007).

*Primary Examiner* — Gordon J Stock, Jr.
(74) *Attorney, Agent, or Firm* — McDonnell Boehnen Hulbert & Berghoff LLP

(57) ABSTRACT

A method for monitoring for seismic events by interrogating an optic fiber which forms part of an existing communications infrastructure to provide distributed acoustic sensing (DAS). The signals provided by the distributed sensing provide measurements at each of a plurality of discrete portions along the fiber, which may be many tens of kilometers in length. Warning or measurement and consequently prediction of seismic activity can be provided by collecting data over a wide area, without the need to deploy a correspondingly large fiber network.

18 Claims, 3 Drawing Sheets

(56) References Cited

U.S. PATENT DOCUMENTS

| | | | |
|---|---|---|---|
| 2006/0253570 A1* | 11/2006 | Biswas et al. | 709/224 |
| 2007/0258319 A1* | 11/2007 | Ronnekleiv et al. | 367/20 |
| 2009/0251991 A1* | 10/2009 | Ayela et al. | 367/20 |
| 2010/0277720 A1* | 11/2010 | Hammons | 356/73.1 |
| 2010/0302549 A1* | 12/2010 | Menezo et al. | 356/478 |
| 2011/0134204 A1* | 6/2011 | Rodriguez et al. | 348/14.03 |
| 2012/0257209 A1* | 10/2012 | Andersen et al. | 356/477 |
| 2013/0139600 A1* | 6/2013 | McEwen-King et al. | 73/655 |
| 2013/0194105 A1* | 8/2013 | Nash et al. | 340/850 |

FOREIGN PATENT DOCUMENTS

| | | | |
|---|---|---|---|
| GB | 2 222 247 | | 2/1990 |
| GB | 2391124 A | * | 1/2004 |
| GB | 2 442 745 | | 4/2008 |
| GB | 2 442 746 | | 4/2008 |
| WO | WO 2010/020795 | | 2/2010 |

* cited by examiner

9,435,902 B2

WIDE AREA SEISMIC DETECTION

BACKGROUND OF THE INVENTION (1) Field of the Invention

The present invention relates to methods and apparatus for wide area detection, analysis and monitoring of seismic events and especially to use of existing communications infrastructure.

(2) Description of the Art

In areas which are prone to earthquakes, monitoring for tremors, i.e. seismic waves may be routinely performed. The detection of seismic waves can be used in an earthquake warning system. The monitoring may involve detecting seismic waves above a certain magnitude threshold that are propagating toward sensitive areas such as population centres or important installations and infrastructure. Detection of shock waves of significant magnitude before they reach the sensitive area may allow a short time for precautionary measures to be taken. If sufficient time is available personnel may be evacuated from high risk areas and/or assembled in specially protected areas. Trains could be slowed or stopped and bridges closed to traffic. Equipment presenting an explosion, fire or pollution risk or other hazard if damaged in an earthquake, such as oil and gas pipelines for example, could be shut down.

Detection and monitoring of a series of minor shocks can also be used by seismologists in attempting earthquake prediction and may allow identification of periods of elevated earthquake risk.

Seismic data acquired during an earthquake can be useful for determining the likelihood of damage to infrastructure such as bridges, dams and the like. The data is also useful for seismologists for use in modelling earthquakes.

Monitoring of seismic data in coastal regions may also be performed as part of a tsunami warning system.

Earthquake warning systems generally require a relatively large number of seismic sensors such as seismographs, accelerometers, geophones etc. which are deployed over a wide area with high speed communications links to a control centre. This can involve a significant number of sensors deployed over a wide area and, in some cases, in different countries.

SUMMARY OF THE INVENTION

It is an aim of the present invention to provide methods and apparatus for seismic monitoring over a wide area.

Thus according to the present invention there is provided method of monitoring for seismic events comprising interrogating at least one optical fibre within a communications infrastructure with optical pulses so as to provide at least one optical fibre distributed acoustic sensor and monitoring the signal from said at least one distributed acoustic sensor for seismic activity.

The method of the present invention uses one or more optical fibres to provide distributed acoustic sensing and monitors the signals generated by the or each optical fibre distributed acoustic sensor to detect seismic events. Optical fibre distributed acoustic sensing is a known technique whereby optical pulses are launched into the fibre and the radiation backscattered from within the fibre is detected and analysed using optical time domain reflectometry (OTDR) techniques. By analysing the radiation Rayleigh backscattered within the fibre, the fibre can effectively be divided into a plurality of contiguous discrete sensing portions. Within each discrete sensing portion mechanical vibrations of the fibre, for instance from acoustic sources, cause a variation in the amount of radiation which is backscattered from that portion. This variation can be detected and analysed and used to give a measure of the intensity of disturbance of the fibre at that sensing portion. As used in this specification the term "optical fibre distributed acoustic sensor" will be taken to mean an optical fibre which is interrogated optically to provide a plurality of discrete acoustic sensing portions distributed longitudinally along the fibre. The step of interrogating the at least one optical fibre with optical pulses so as to provide an optical fibre distributed acoustic sensor therefore comprises the steps of, for the or each fibre: launching a series of optical pulses into said fibre and detecting radiation Rayleigh backscattered by the fibre; and processing the detected Rayleigh backscattered radiation to provide a plurality of discrete longitudinal sensing portions of the fibre.

GB Patent Application No. GB2,442,745 describes a method of interrogating an optical fibre to provide an optical fibre distributed acoustic sensor. The method described therein may be used in the method of the present invention and the contents of GB2,442,745 are hereby incorporated by reference thereto. This patent application describes that by interrogating an optical fibre with pairs of optical pulses having a frequency difference between each pulse in the pair and by demodulating the returned signal at the appropriate frequency difference an acoustic signal corresponding to a specific section of fibre can be obtained.

An optical fibre distributed acoustic sensor such as described in GB2,442,745 can be implemented using a standard optical fibre. In other words no modifications are needed to the fibre to provide a fibre suitable for distributed acoustic sensing. Inhomogeneities normally present within the fibre act as scattering sites for Rayleigh backscattered radiation.

In the method of the present invention the optical fibres used are within a communications infrastructure, i.e. they form at least part of a communications infrastructure and have been provided for the purposes of communication. Thus typically these fibres will form part of an existing infrastructure and thus will already be in position. The method of the present invention thus lies partly in the realisation that optical fibres deployed as part of a communications infrastructure such as a communications network or the like can be used to provide optical fibre distributed acoustic sensing and that such optical fibre distributed acoustic sensors can be used to detect seismic events and provide wide area detection and monitoring for large scale seismic events. A large scale seismic event is an event, such as an earthquake that causes strong seismic waves that propagate over a large distance or wide area, i.e. areas of tens of kilometers or hundreds of kilometers or more.

Often in highly populated areas there are existing widely deployed networks of optical fibre telecommunications cable. By arranging some of these fibres as optical fibre distributed acoustic sensors a wide area can be provided with sensors using the existing communications infrastructure.

However it is possible that new communications infrastructure involving optical fibres may be provided and at least one of such optical fibres used to provide a distributed acoustic sensor. With this in mind it is possible that the path of the new optical fibres may be arranged with a view to providing a useful path for seismic monitoring.

Optical fibre distributed acoustic sensors, as mentioned, rely on radiation backscattered from the fibre. As the amount of radiation backscattered is relatively low, and the backscattered radiation will be attenuated during the return trip through the fibre, the effective length of the distributed acoustic sensor may be less than the total length of the fibre. Optical fibre distributed acoustic sensors based on Rayleigh backscattering typically demonstrate a linear optical response within the fibre and so the intensity of the interrogating pulses is restricted by a threshold beyond which non-linearity would occur. The effective range within the fibre is therefore partly determined by the duration of the interrogating pulses. The duration of the pulses also has an impact on the basic spatial resolution of the sensor, i.e. the spatial size of the discrete longitudinal sensing portions.

Optical fibre distributed acoustic sensors with a basic spatial resolution of about 10 m have been achieved with lengths of up to 40-50 km or so. In other words, interrogation of a fibre from one end of the fibre can provide up to 50 km of discrete sensing portions of the fibre, each sensing portion being about 10 m in length. A fibre longer than 50 km could be interrogated from each end, in this way a fibre of up to 100 km in length could be used to provide a continuous sensor with a spatial resolution of 10 m. Using longer pulses can extend the length of fibre which forms part of the sensor at the expense of a basic spatial resolution having a longer sensing portion. However, for monitoring for large scale seismic events a longer sensing portion may be acceptable (and may even reduce the amount of processing required).

It will therefore be clear that a single optical fibre can be used to provide a sensor of up to 50 km or more in length with discrete sensing portions distributed along that length. Several such sensors can easily provide wide area coverage. The present method therefore has the advantage of providing a relatively long chain of distributed acoustic sensing portions using a sensor comprising a single optical fibre. Several such sensors can be employed to provide a monitoring network for seismic events utilising existing communications infrastructure.

Preferably the method therefore comprises providing a plurality of optical fibre distributed acoustic sensors. Using a plurality of sensors increases the territorial coverage and increases the likelihood that a seismic event will be detected in sufficient time to generate a warning and can aid in detecting large scale seismic events.

As the skilled person will appreciate a large scale seismic event such as an earthquake will generate different seismic waves. Typically an earthquake will generate P and S body waves and also may generate some surface waves such as Rayleigh or Love waves.

P and S waves are different types of body waves. P waves, often called primary or pressure waves, are longitudinal or compressive waves that propagate by compressing material in the direction of travel of the wave. P waves can travel through solids as well as gases and liquids. S waves, often called secondary or shear waves, are transverse waves that can propagate through solid materials only.

P and S waves travel at different speeds through material with the S waves having a propagation speed about 0.6 times that of the P wave in any given medium. Although the absolute speed of propagation depends on the medium the relative speed remains roughly constant in most materials. Thus, from any remote event that generates both P and S waves, the P waves will arrive first. The surface waves are typically slower still with Love waves having a slightly faster propagation than Rayleigh waves but both propagating at speeds of the order of 0.9 times the speed of S waves.

In an earthquake both P and S body waves will be produced but typically the S waves will have the greater magnitude and tend to be the most destructive. The surface waves can also be destructive. Detection of the P wave can therefore be used as warning of an earthquake and detection of the P wave can give a short period of warning before arrival of the potentially more destructive S wave and surface waves.

Depending on the arrangement of the or each optical fibre distributed acoustic sensor, the P wave will be detected as a relatively high intensity disturbance which affects several discrete sensing portions in sequence. In other words if a P wave from a particular source impinges on a particular fibre it may cause a disturbance in various sections of the fibre in a particular sequence. For example imagine a linear fibre with a P wave incident from the side. In a first time period the P wave may impinge on a first sensing portion, with a resulting relatively large amplitude disturbance being detected at this point. In a following time period the P wave may reach the sections of fibre on either side of the first sensing portion. In subsequent time periods the wave may impinge on sections further and further away from the first section. For a large scale seismic event, such as an earthquake with destructive potential, it will be expected that the P wave will be detectable across a large portion of the sensing fibre.

Thus a relatively large disturbance affecting several discrete sensing portions of the fibre may be indicative of a large scale seismic event. If other optical fibre distributed acoustic sensors in the area also experience a similar disturbance this may be taken as indication of arrival of a P wave. If the intensity of the disturbance is above a certain threshold this may be used to generate a warning. Thus the method may comprise detecting a pattern of disturbances in several discrete sensing portions of at least one optical fibre distributed acoustic fibre.

The method may comprise detecting the direction of propagation of the seismic wave, for example by detecting disturbances in two separate optical fibre distributed acoustic sensors that relate to propagation of the same seismic wave. The method may also comprise estimating the location of the origin of the seismic wave, for instance by comparing the relative time of arrival of the seismic wave at three or more locations (that are not co-linear). Estimating the location of the seismic wave may allow an estimate of the time remaining before arrival of the potentially destructive S body wave. Additionally or alternatively the time of arrival of the S wave may be estimated based on previously detected seismic events.

The method may therefore provide generating one or more alarms when a seismic wave above a certain intensity threshold is detected. One or more alarms may be automatically relayed to important or sensitive locations.

The arrival of the S body wave may be separately detected. The S wave will arrive after the P wave and will cause disturbances in the same optical fibre distributed acoustic sensors as the P wave and in substantially the same order. The P and S waves will generally have the shaped wavefront, although geographical variations in the constitution of the underlying ground/rock may mean that there are small variations between the incident wavefronts of the P and S waves. Thus the subsequent S wave will cause disturbances in substantially the same sensing portions of the optical fibre distributed acoustic sensors in substantially the same order as the P wave, albeit with a slower rate of evolution due to the slower propagation speed of the S wave. Detection of a second series of disturbances related to a first series of disturbances can therefore be used to as an indication of seismic waves. If an alarm is not generated on the basis of detection of the P wave alone, separate detection of the S wave can be taken as confirmation of a large scale seismic event and used to generate an alarm.

As the method of the present invention makes use of optical fibres within an existing communications infrastructure the possible arrangement of the optical fibres used to provide distributed acoustic sensors is determined by the arrangement of the communications links.

Preferably a plurality of optical fibres are used as optical fibre distributed acoustic sensors with the choice of the relevant fibres used being such to provide the best possible discrimination of incident seismic waves. For example the optical fibres implemented as distributed acoustic sensors preferably includes at one fibre where at least part of the fibre runs in a different direction to at least part of another fibre, e.g. one fibre with a substantial north-south direction may be used as a distributed acoustic sensor and another fibre with a substantial east-west direction may also be used. The optical fibres chosen to use as distributed acoustic sensor may be selected to provide a certain density of sensors or a maximum distance between sensors.

Conveniently, when monitoring an area of importance, such as a population centre or the like, at least part of at least one optical fibre distributed acoustic sensor lies towards the periphery or outside of the main area of importance to provide as much warning as possible. If the likely source of an earthquake epicentre is known, optical fibres which lie between the fault zone and the area of importance may preferentially be provided as optical fibre distributed acoustic sensors, although having optical fibre distributed acoustic sensors surrounding the area of importance in at least three different directions may be preferred to provide as early detection as possible of seismic waves incident from any direction.

Whilst the present invention conveniently makes use of existing communications infrastructure one or more additional optical fibre distributed acoustic sensors forming part of a wide area seismic monitoring network may use optical fibres which have been specifically arranged in a location solely for the purposes of distributed acoustic sensing. For example if the existing communications infrastructure has an obvious geographical gap in the coverage one or more fibres could be laid in such areas to improve the overall coverage of the network.

The optical fibres within the existing communications infrastructure may comprise optical fibres comprising part of an optical fibre bundle used for telecommunications. The optical fibre may be a fibre that is used normally for telecommunications and the optical pulses used for distributed acoustic sensing may be time division multiplexed with communications traffic. It will be appreciated that in time division multiplexing sufficient time should be allowed during the periods allocated to distributed acoustic sensing for a round trip for an interrogation pulse to and from the most distant sensing portion of the fibre. This may represent a relatively long time window used for distributed acoustic sensing and may significantly impact on the amount of data traffic transmitted through the fibre. Thus time division multiplexing may be acceptable for optical fibres with relatively low amounts of data traffic but it may not be appropriate for an optical fibre used for large amounts of data transfer. Further time division multiplexing means that the distributed acoustic sensor has periods when no sensing is performed, introducing a small potential delay into detection of a seismic wave.

Preferably therefore the optical fibre used for the distributed acoustic sensor is an otherwise unused optical fibre in the bundle, i.e. a dark fibre. When installing optical fibre communications links it is common practice to include one or more optical fibres in the bundle than are currently required. The costs of physically installing the fibre bundle, e.g. burying it in the ground are significant compared to the cost of additional optical fibres and thus additional fibres are typically included to provide headroom for increased data traffic and redundancy in the event of failure of an individual fibre. Thus many optical fibre links are provided via fibre optic bundles that contain one or more unused optical fibres.

The communications infrastructure could be part of a general telecommunications network or could be a dedicated point to point link. In some instances the optical fibre could be associated with a particular installation. For instance oil and gas pipelines are often laid with optical fibres running the length of the pipeline for communication and control. Such optical fibres could be used to provide distributed acoustic sensing to monitor for seismic events, as part of a wide area network and/or as part of a specific warning system for the pipeline.

As well as providing warning of a large scale seismic event the method of the present invention allows identification of large scale seismic events, for example for purpose of analysis. As described above the P and S waves associated with a large scale seismic event can be detected and used to determine the origin of the event. Thus the epicentre of an earthquake may be located and data regarding the seismic waves recorded for later analysis.

The difference in time of arrival of the P and S waves at two or more different discrete longitudinal sensing portions may be used in determining the origin of the seismic waves. Although the absolute velocity depends on the material that the waves are propagating through, S waves generally propagate at a speed about 0.6 times the speed of the P waves. If there is a first time difference between detection of the P wave and subsequent detection of the S wave at a first discrete sensing portion and a second time difference between the times of arrival at the P and S waves at a second discrete portion, the ratio of the first and second time differences may be assumed to also be the ratio between the distances of the first and second sensing portions from the origin. By looking at the time differences from a number of different sensing portions the origin of the P and S waves may be determined. It should be noted however that if the fibre is substantially rectilinear the determination of origin may have some ambiguity associated with it. The method may also comprise using the shape of at least one of the first and second wavefronts to determine the origin of the P and S waves.

The method may also comprise analysing data from other sources of seismic data, such as dedicated seismographs or accelerometers Data from various sources may be combined to help detect the seismic event and/or to determine an appropriate response. For instance if a seismic wave is detected by the at least one distributed acoustic sensor the data from a seismograph or accelerometer may be analysed to determine an indication of magnitude. If the magnitude is above a certain threshold an alarm may be generated.

Detection of the seismic waves in certain areas may allow an estimation of the likelihood of damage in certain areas For example if at least part of an optical fibre distributed acoustic sensor runs through or close to a significant area, for instance the location of a power plant or a bridge or the like, following a significant seismic event the data in the vicinity of the significant area may be analysed to determine the amount of disturbance experienced.

In addition the method may comprise the step of, following a significant seismic event, comparing an acoustic profile obtained after the seismic event with an acoustic profile obtained before the event.

An optical fibre, especially one which is buried for instance, will, in normal operation, detect many disturbances in the discrete sensing portions of the fibre due to ambient noise and vibrations. Whilst this ambient noise may be transitory the overall level of ambient noise tends to be constant, although noise from man made sources such as industrial activity or road noise may vary during the course of the day. For instance road noise may be at a constant high level during morning or evening rush hour and a minimum during the middle of the night.

The noise and vibrations will be transmitted to the fibre via the material surrounding the fibre, such as the ground, and the nature of the material will determine the degree of attenuation etc experienced. Variations in the constitution of the ground along the length of the fibre will lead to different responses along the length of the fibre.

Thus an acoustic profile of the ground along a length of the fibre can be taken by integrating the acoustic response from the length of the fibre over a short period of time to reduce the effects of transients. This acoustic profile can be used to determine any changes in ground condition. Comparing the acoustic profile obtained from a length of fibre with a baseline acoustic profile obtained from the same length of fibre can allow any significant changes in condition of the ground to be observed. For example if there is a significant difference in the average intensity recorded in several adjacent sensing portions of fibre in the two profiles this may be indicative of a significant change in the ambient noise or a change in the ground conditions in that area. To reduce the effect of significant changes in ambient noise the acoustic profiles may be categorised according to various acoustic situations, e.g. working day—rush hour, working day—non rush hour, non-working day, night etc. and the appropriate baseline profile used. Further the baseline acoustic profiles may be generated from the results of profiles generated at several different times.

Detecting a change in ground conditions can be especially important following an earthquake. Earthquakes can occasionally cause ground liquefaction where the vibration caused by the earthquake causes the ground to change state to from a solid or aggregate, such a soil, to a state having a liquid consistency. Buildings or structures built on ground that liquefies can sink into the ground and/or collapse. Further, earthquake damage may result in cracks or voids in previously solid materials such as concrete structures and the like.

Such changes in the material within which the fibre is embedded will alter the propagation of vibrations within the material and thus will show up as a change in the acoustic profile in the relevant section of the fibre. Thus the method may involve, following a seismic event, obtaining an acoustic profile from one or more of the optical fibre distributed acoustic sensors and comparing the profile to an appropriate baseline profile for that sensor. Any significant changes may be flagged as a potential indication of damage and used to highlight an area to be investigated.

Clearly if the earthquake causes widespread damage to the area the acoustic profile is likely to be significantly different. However if the perceived damage is light or non-existent the acoustic profiling may identify areas where damage may have occurred but is not immediately apparent. This method of using an optical fibre distributed acoustic sensor to determine changes in an acoustic profile following a large scale seismic event as indications of possible damage represents another aspect of the invention and may be implemented even if wide area detection and monitoring for seismic activity is not performed for the purposes of advance warning.

The method of monitoring for seismic activity may be used to detect significant seismic events other than earthquake tremors. Large explosions will also create significant seismic waves. Thus the method of the present invention may be used to identify large scale explosions. The method may thus be useful in detecting for Nuclear Explosion tests and/or monitoring compliance with test bans.

Whilst the method has been described in terms of interrogating one or more fibres it will be appreciated that the optical fibre distributed acoustic sensors may be widely deployed and some may deployed in different countries. In another aspect therefore the present invention provides a method of detecting large scale seismic events comprising receiving the results from a plurality of optical fibre distributed acoustic sensors and processing the results to detect large scale seismic events. Preferably the or each optical fibre distributed acoustic sensor comprise an optical fibre which is within a communications infrastructure, i.e. forms part of an existing communications infrastructure.

The method may involve receiving all measured data from the optical fibre distributed acoustic sensors. In other words the raw backscatter data is received and processed to determine the acoustic response from the sensing portions of the fibre. Thus the step of receiving the results may comprise receiving data corresponding to a plurality of measurements of detected light which is Raleigh backscattered following repetitively launching a series of optical pulses into an optic fibre The step of processing the results may therefore comprise analysing the data to determine a measure of disturbance for a each of a plurality of discrete longitudinal sensing portions of each optic fibre and analysing said measures of disturbance to detect a seismic wave.

Alternatively the data may be processed to provide the response from the discrete sensing channels prior to being received in which case the step of receiving the results comprises receiving data corresponding to a measure of disturbance for a each of a plurality of discrete longitudinal sensing portions of each optical fibre. The step of processing the results thus comprises analysing said measures of disturbance to detect a seismic wave.

The method of this aspect of the invention has all of the same advantages and provides all of the same benefits as the first aspect of the invention and may be used with any of the embodiments described previously.

In another aspect the present invention provides a network of sensors for detecting seismic events comprising a plurality of optical fibre distributed acoustic sensors, and at least one controller arranged to receive data from each of the plurality of optical fibre distributed acoustic sensors and analyse said data to detect a seismic event. At least one of the plurality of optical fibre distributed acoustic sensors may comprise an optical fibre within a communications infrastructure, i.e. an optical fibre used for communications or forming part of a bundle of fibres used for optical communications.

The network of this aspect of the present invention again offers the same advantages as described above in relation to the other aspects of the same invention and any of the methods described may be implemented using the network of this aspect of the invention.

In general the present invention relates to the use of at least one optical fibre comprising part of an existing optical communications infrastructure for fibre optic distributed acoustic sensing to provide seismic monitoring for large scale seismic events.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

The invention will now be described by way of example only with respect to the following drawings, of which.

DESCRIPTION OF THE INVENTION

Figure 1:
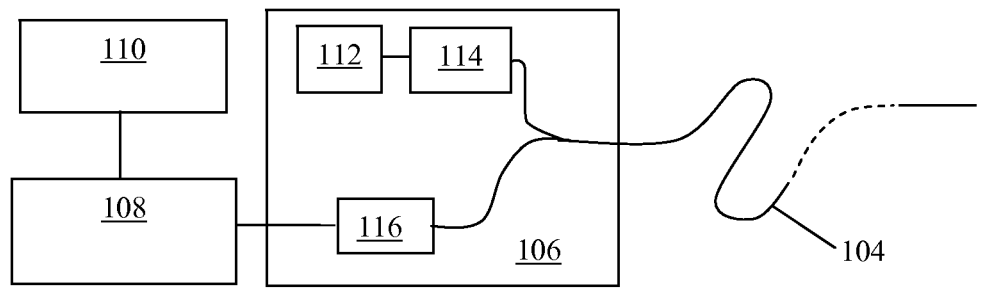
FIG. 1 illustrates the basic components of a distributed fibre optic sensor.

FIG. 1 shows a schematic of a distributed fibre optic sensing arrangement. A length of sensing fibre 104 is connected at one end to an interrogator 106. The output from interrogator 106 is passed to a signal processor 108, which may be co-located with the interrogator or may be remote therefrom, and optionally a user interface 110, which in practice may be realised by an appropriately specified PC.

The sensing fibre 104 can be many kilometers in length, and in this example is approximately 40 km long. The sensing fibre is a standard, unmodified single mode optic fibre such as is routinely used in telecommunications applications. In conventional applications of optical fibre distributed acoustic sensors the sensing fibre is at least partly contained within a medium which it is wished to monitor. For example, the fibre 104 may be buried in the ground to provide monitoring of a perimeter or monitoring of a buried asset such as a pipeline or the like.

In operation the interrogator 106 launches an interrogating optical signal, which may for example comprise a series of pulses having a selected frequency pattern, into the sensing fibre. The optical pulses may have a frequency pattern as described in GB patent publication GB2,442,745 the contents of which are hereby incorporated by reference thereto. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB2,442, 745. The signal processor may also apply a phase unwrap algorithm as described in GB2,442,745.

The form of the optical input and the method of detection allow a single continuous fibre to be spatially resolved into discrete sensing lengths. That is, the acoustic signal sensed at one sensing length can be provided substantially independently of the sensed signal at an adjacent length. The spatial resolution may, for example, be approximately 10 m, which for a 40 km length of fibre results in the output of the interrogator taking the form of 4000 independent data channels.

In this way, the single sensing fibre can provide sensed data which is analogous to a multiplexed array of adjacent independent sensors, arranged in a linear path. Data can be acquired from all sensing lengths or data channels substantially simultaneously, and therefore by taking a series of readings over time, a 2D data array can be produced.

Figure 2:
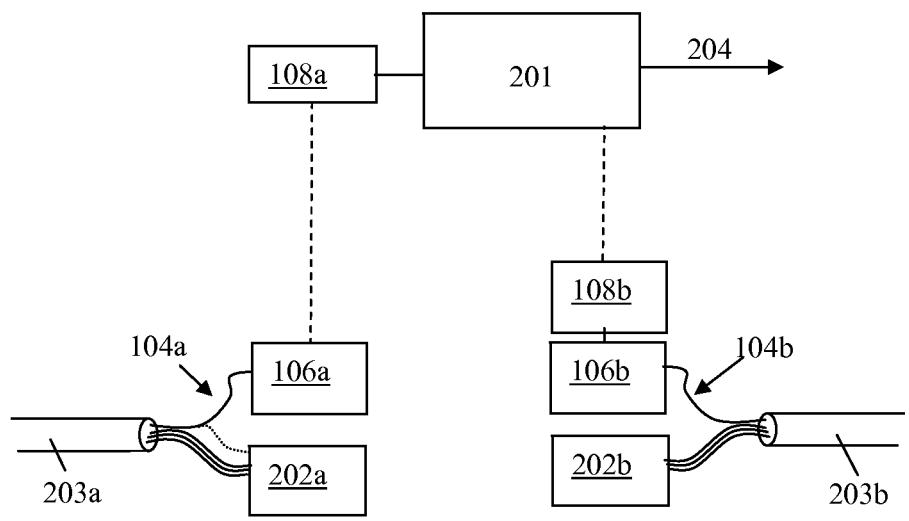
FIG. 2 a plurality of distributed acoustic sensors according to an embodiment of the present invention.

FIG. 2 shows an embodiment of the present invention suitable for monitoring for earthquakes, or other large scale seismic events, wherein a plurality of optical fibre distributed acoustic sensors are implemented using existing communications infrastructure. In FIG. 2 a first communications node 202a is connected to a first fibre optic bundle 203a in a first location. The communication node 202a may be a hub in a communications network or an endpoint in such a network or the endpoint of a point to point fibre communications link. Communication node 202a transmits and/or receives data via one or optical fibres in the fibre optic bundle 203a in accordance with standard optical telecommunications. Fibre bundle 203a as therefore previously been deployed, preferably buried underground, between the location of communications node 202a and a remote location, which could be many tens or kilometers away.

In this embodiment however one optical fibre 104a of the bundle 203a is also connected to an interrogator 106a as described above. The interrogator operates as described above and thus uses fibre 104a of bundle 203a as the sensing fibre in a optical fibre distributed acoustic sensor.

Preferably the optical fibre 104a is an otherwise unused fibre in the bundle 203a, a so called dark fibre, however if no fibres in the bundle are otherwise unused, or there is only a single optical fibre in the bundle, the same fibre 104a may be used by both communications node 202a and interrogator 106a at different times.

Similarly a second communications node 202b is connected to a second fibre optic bundle 203b for optical communication. Second communications node 202b may be co-located with communications node 202a, for instance in a network hub point or relay station, however node 202b may be in an entirely different location to node 202a.

Again one of the fibres 104b of the bundle 203b is connected to an interrogator 106b and thus fibre 104b also acts as a sensing fibre in a optical fibre distributed acoustic sensor.

The data from the distributed acoustic sensors is transmitted to a central controller 201. This data link may implemented using any suitable communications link, e.g. RF communication, optical communication (possibly via the same optical communications network, i.e. interrogator 106a may pass the received data to the communications node 202a for transmission via a different fibre of the bundle 203a) or other data network. The data link should be high speed however because delays in data transmission will reduce the amount of warning time available. In the embodiment shown the interrogator 106a transmits the raw data to a remote signal processor 108a which may be co-located with the controller 201 or may be at some intermediate location. This requires the transfer of relatively large amounts of data. Alternatively the signal processor could be co-located with the interrogator. This allows a large amount of the signal processing to be done locally and thus the amount of data to be transferred may be reduced. Indeed data may only be transferred to the controller under certain conditions, e.g. signals above a certain threshold and/or signals matching a particular characteristic. However this required a suitably fast processor to be located near to each interrogator.

The controller receives the data, whether pre-processed or not, and analyses the data from all the distributed acoustic sensors to detect seismic patterns indicative of an earthquake above a certain magnitude. In the event such signals are detected an automatic alarm 204 is generated and transmitted to various locations. The alarm may be automatically broadcast to allow people evacuate high risk areas and/or assembled in safe zones. The alarm may allow transit authorities to slow or stop trains and other public transport and close vulnerable or high risk infrastructure such as bridges. Alarms may be sent to power stations or other industry to take precautions against fire, explosion or pollution risk, e.g. oil and as pipelines might be temporarily shut down. The skilled person will appreciate that a wide range of measures may be taken based on the likely amount of time and the expected magnitude.

This embodiment of the present invention exploits the fact that distributed acoustic sensing can be implemented using standard, unmodified telecoms optical fibre and that in populated areas there may well be a widely deployed optical fibre network.

Figure 3:
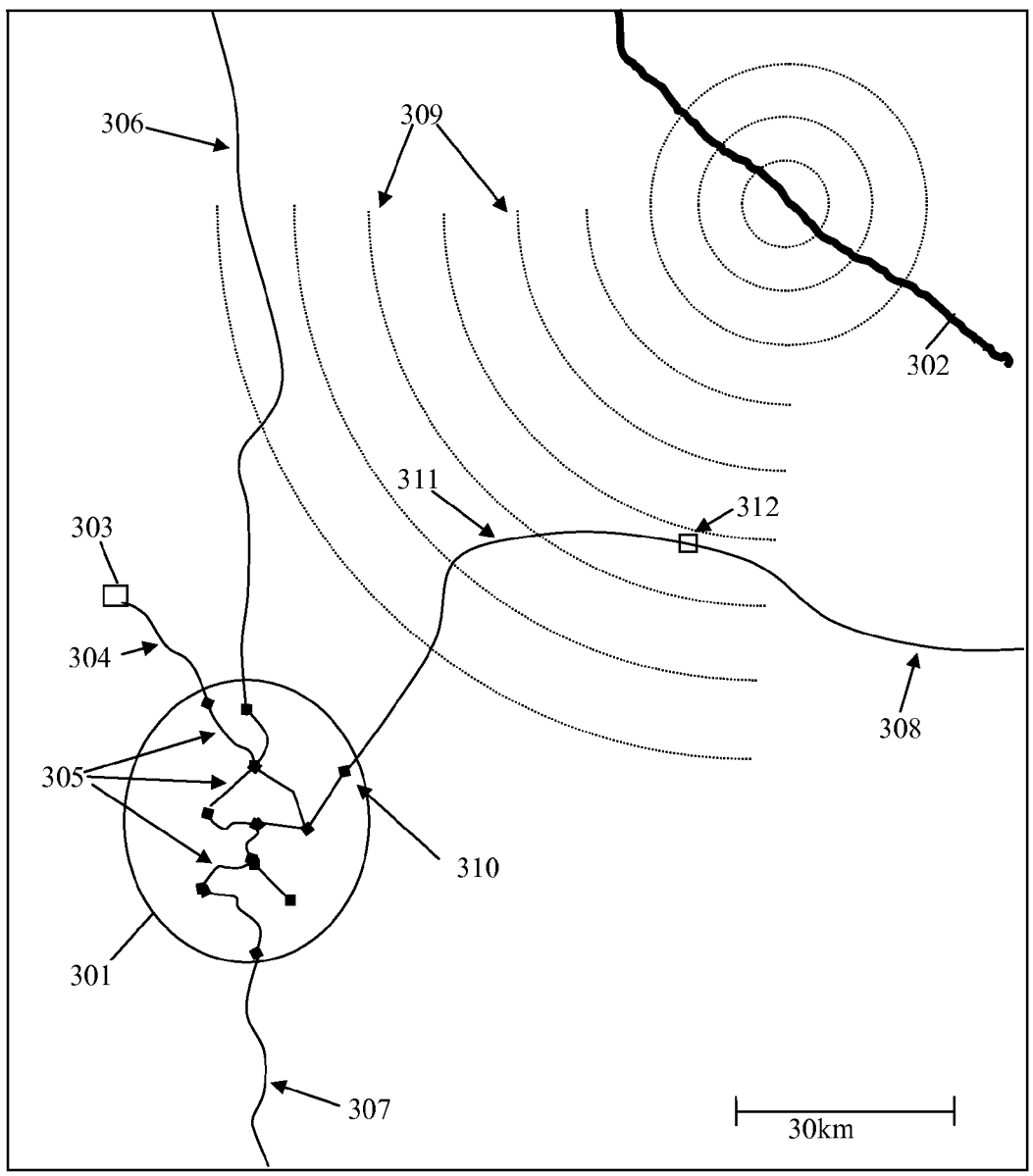
FIG. 3 illustrates the principle of wide area seismic detection.

FIG. 3 shows illustrates a hypothetical map illustrating the principles of the invention. In FIG. 3 a population centre is located within area 301. This population centre is located in the vicinity of a known fault zone represented by line 302. Area 301 is therefore located in an area with possible earthquake risk. Within the area 301 of the population centre there may be various fibre optic links 305 providing communications links between various institutions and/or an optical fibre communications network.

Also shown in FIG. 3 is an installation of importance 303. This may be a power station or power distribution station. An optical fibre communications link 304 may be provided with this installation. Alternatively the installation could form part of an oil or gas pipeline infrastructure and the communication link 304 may be provided along the line of the pipeline.

As well as several local optical fibre links there are a plurality of longer distance optical links 306, 307 and 308, for longer distance optical communication.

According to an embodiment of the present invention at least some of these exiting optical fibre communication links are used for distributed acoustic sensing as described above with reference to FIG. 2.

Within area 301 representing the main population centre there is a relatively high density of fibre links. Several of these optical fibre links could be implemented as distributed acoustic sensors, preferably the appropriate links being chosen to provide a reasonable territorial coverage and preferably involving significant lengths of fibre arranged in different directions, e.g. one of the generally north-south links could be chosen along with on of the generally east-west links.

In the event of an earthquake occurring with an epicentre around the fault zone 302 seismic waves will propagate toward the area 301 of the population centre. Wavefronts 309 represent the progression of the wavefronts over time (generally circular wavefronts are shown for ease but the skilled person will appreciate that the wavefronts will generally have more complex forms and the wavefronts will be shaped by the properties of the ground through which they propagate).

As the skilled person will appreciate an earthquake will typically generate P and S body waves and also R and L surface waves. P waves, often called primary or pressure waves, are longitudinal or compressive waves that propagate by compressing material in the direction of travel of the wave. P waves can travel through solids as well as gases and liquids. S waves, often called secondary or shear waves, are transverse waves that can propagate through solid materials only.

P and S waves travel at different speeds through material with the S waves having a propagation speed about 0.6 times that of the P wave in any given medium. Although the absolute speed of propagation depends on the medium the relative speed remains roughly constant in most materials. Thus, from any remote event that generates both P and S waves, the P waves will arrive first. The surface waves tend to travel slightly slower than the S waves, at about 0.9 times the speed of the S wave.

In an earthquake the most destructive seismic waves are the S body waves and the surface waves. Detection of the P waves can therefore be used as warning of an earthquake before the more destructive S waves and surface waves arrive.

The detection of the P wave by distributed acoustic sensors within area 301 may therefore be used to generate an earthquake warning.

In use the distributed acoustic sensors implemented within area 301 will detect various vibrations from a variety of noise or vibration sources. Some noise or vibration sources will be localised in some parts of the fibre and some noise or vibration sources will be transient in nature whereas other may be more constant. A P wave due to a significant earthquake will cause vibration of the majority of the fibres however and the propagation of the P wave will cause a particular pattern of disturbances. Thus a series of significant disturbances affecting all the distributed acoustic sensors within area 301 within a time period consistent with propagation of a P wave may be used as an indication of a seismic event and an alarm may be generated.

The amount of time provided by the alarm will obviously depend on a number of factors including the distance from the epicentre of the earthquake, the type of ground and hence the propagation speed of the seismic waves and any processing delays. In the hypothetical example shown in FIG. 3 the area 301 is about 100 km from the epicentre of the earthquake. P waves have a speed of about 5000 m/s in rock such as granite. Thus the P waves will arrive about 20 s after the initial earthquake event (ignoring the depth at which the seismic wave is generated). The S waves will travel at about 3000 km/s and thus will arrive about 33 s after the initial event, or approximately 13 s after the P waves. Thus the maximum amount of warning before any S waves arrived would be 13 s.

In addition, or as an alternative, to using the fibre links within area 301 however the long distance fibre links may be used. The long distance fibre links provide a greater length of sensing fibre and thus may allow better characterisation of the disturbances.

Further the long distance links may extend into an area which allows advance warning of incident seismic waves. If the earthquake epicentre is most likely expected in the region of fault zone 302 fibres 308 and 306 may detect the seismic waves before they even reach the population area.

Fibre 308 may be interrogated by an interrogator based in node 310 say. The length of fibre that can be interrogated will depend on various factors including the duration of the optical pulses used to interrogate the fibre, which determines the basic spatial resolution of the sensing fibre. Using a spatial resolution of the order of 10 m or so, i.e. each discrete sensing portion of the fibre is 10 m or so long, a length of up to about 50 km can be interrogated, i.e. the fibre up to about point 311 could acts as an optical fibre distributed acoustic sensor. It will be appreciated that this would allow detection of the depicted earthquake event significantly earlier. Detection of a significant disturbance over the last 10 km of fibre say could be used to generate an alarm. Thus the P wave could be detected approximately 40 km away from the population area, or approximately 8 seconds earlier, giving a warning time of just over 20 s before the S wave reaches area 301.

Longer than 50 km of sensing may be achieved by using longer interrogation pulses, with a consequent increase in spatial size of the sensing portions of fibre. For detecting seismic events a longer spatial size may be acceptable, or even beneficial and thus much longer lengths of fibre may be sensed.

Of course if there were a relay station or the like in the long distance fibre, such as at position 312 interrogators could be located at the relay station and used to monitor the fibre in both directions from the relay station. In some instance it may be beneficial to actually dig up the fibre bundle at a particular point to add an interrogator in a desired part of the fibre path.

As the seismic waves propagate the location of the epicentre may be determined. For instance the time of arrival of the seismic waves at different parts of fibres 308 and 306 may be used to determine the epicentre. From such determination an estimate of time of arrival of the S waves may be determined.

During the course of the seismic event the S wave may be subsequently detected and may be used to confirm that a large scale seismic event is occurring.

Figure 4:
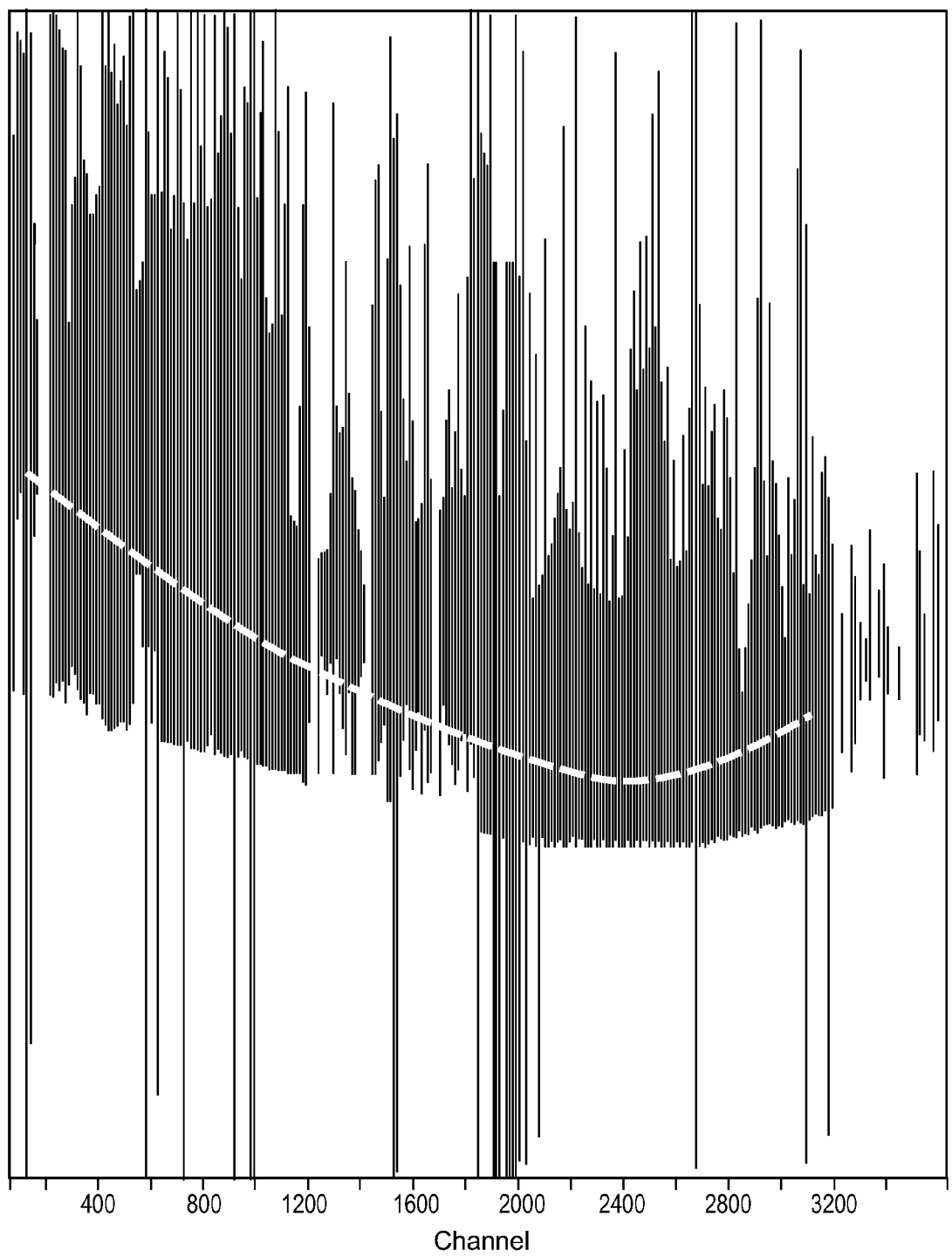
FIG. 4 shows the data from an optical fibre distributed acoustic sensor during an earthquake.

The present invention relies partly on the ability of optical fibre distributed acoustic sensors to allow detection of seismic waves. FIG. 4 shows an actual plot of signal returns from a single optical fibre distributed acoustic sensor during an earthquake of magnitude 4.0 with an epicentre close to the sensing fibre. FIG. 4 shows a waterfall plot where time is plotted on the y-axis, distance along the fibre on the x-axis and acoustic amplitude is illustrated by the intensity of the data point. The optical fibre was interrogated with pulses that resolved the fibre into about sensing portions of 10 m in length.

It can be seen from FIG. 4 that the incidence of the P wave can be clearly distinguished as a first series of disturbances that initial are detected at channels around 2400. As, in this instance each channel represents a 10 m section of fibre, this corresponds to a distance of about 24 km along the fibre length. The disturbance then spreads to the neighbouring channels as time progresses. It can be seen from the left hand side of the plot that the onset of the disturbances follows a line of roughly constant gradient indicating a propagation speed.

A short time later, only a few seconds in this case, the S wave arrives and a new series of disturbances with a greater intensity are detected. The S wave arrives whilst the P wave effects are still evident, however the S wave can be made out as a variation in intensity that affects several channels of the sensor over time, and is emphasised by the superimposed dashed line. It can be seen from FIG. 4 that the S wave has the same general point of incidence on the fibre and spreads in generally the same manner as the P wave, but that the slope of the S wave is steeper, indicating a slower propagation speed.

It will therefore be appreciated that seismic waves can have significant effects on a optical fibre distributed acoustic sensor and that the P and S waves due to an earthquake can be separately detected.

Once the initial seismic waves have been detected and any necessary alarms generated the data recorded during the course of the earthquake may be detected and analysed, for instance to identify areas of particularly intense disturbances that may have been damaged.

After the seismic waves have passed an acoustic profile from one or more optical fibre distributed acoustic sensors may be compared with a suitable baseline acoustic profile acquired from before the seismic event.

In normal operation each discrete sensing portion of the distributed acoustic sensor will respond to even gentle vibrations transmitted through the surrounding material ground such as the ground. In monitoring for earthquakes and the like responses below a certain threshold may be ignored as the signals of interest will cause significant vibration. However the response to ambient noise may be monitored and may be used to determine an acoustic profile for the sensor. An acoustic profile comprises the averaged intensity of detected disturbances over a short period of time. Averaged signals are used to remove the effects of short term transients.

The acoustic profile therefore gives a picture of the average acoustic level for each section of the sensing fibre. This will depend on the general level of ambient noise and also the material surrounding the fibre—i.e. how much it attenuates vibration etc.

To account for the fact that the ambient noise level may change at different times, e.g. industrial noise may be less during the night, roads may be less busy etc. various different categories of baseline profile may be acquired for different times of day. Different profiles may also be acquired based on the weather conditions as wet ground for instance may have different acoustic properties to dry ground.

After a seismic event has been detected a new acoustic profile may therefore be acquired and compared to an appropriate baseline profile. Any significant changes in the material within which the fibre is embedded should result in change in the acoustic profile. For instance if the ground in one area has undergone liquefaction the acoustic profile in that area will be expected to change. Thus comparison of the new acoustic profile with the baseline profile may highlight areas where manual inspection for damage should be performed.

It will be noted that each feature disclosed in the description, and (where appropriate) the claims and drawings may be provided independently or in any appropriate combination.

The invention claimed is:
1. A method of monitoring an area of interest for an earthquake comprising:
operating at least one distributed acoustic sensor interrogator unit connected to an optical fibre communications infrastructure to provide fibre optic distributed acoustic sensing on one or more optical fibres of said optical fibre communications infrastructure, wherein each distributed acoustic sensor interrogator unit is connected to a respective optical fibre within a respective optical fibre bundle of said communications infrastructure and at least one other optical fibre of said optical fibre bundle is connected to a communications node operating to transfer data which is not related to monitoring the area of interest via the optical fibre bundle; and processing signals detected by said at least one distributed acoustic sensor interrogator unit to detect signals indicative of an earthquake.

2. A method as claimed in claim 1 wherein operating said at least one distributed acoustic sensor interrogator unit comprises, for each distributed acoustic sensor interrogator unit: interrogating said optical fibre connected to the distributed acoustic sensor interrogator unit with optical pulses so as to provide an optical fibre distributed acoustic sensor producing a measurement signal from each of a plurality of discrete longitudinal sensing portions of said fibre.

3. A method as claimed in claim 1 wherein interrogating the optical fibre with optical pulses so as to provide the optical fibre distributed acoustic sensor comprises the steps of:

launching a series of optical pulses into said fibre and detecting radiation Rayleigh backscattered within the fibre; and processing the detected Rayleigh backscattered radiation to provide said plurality of discrete longitudinal sensing portions of the fibre wherein the size of said discrete longitudinal sensing portions depends on the optical pulses and processing applied.

4. A method as claimed in claim 1 wherein said at least one optical fibre distributed acoustic sensor interrogator unit is arranged to provide monitoring for earthquakes in an area which is a least 10 kilometers wide.

5. A method as claimed in claim 1 wherein the discrete longitudinal sensing portions of each optical fibre has a spatial size in a range of 10 m to 100 m.

6. A method as claimed in claim 1 wherein at least one optical fibre forming the communications infrastructure that is used to provide an optical fibre distributed acoustic sensor comprises an optical fibre that is also used for telecommunications, and wherein optical pulses used for distributed acoustic sensing are time division multiplexed with communications traffic within the optical fibre.

7. A method as claimed in claim 1 wherein the method is performed at the same time that the existing communications infrastructure is also being used for communicating data not related to seismic monitoring.

8. A method as claimed in claim 1 wherein at least one optical fibre forming part of the communications infrastructure that is used to provide an optical fibre distributed acoustic sensor comprises an optical fibre within an optical fibre bundle used for telecommunications.

9. A method, as claimed in claim 1, comprising detecting a seismic event, and comparing an acoustic profile obtained after the seismic event with an acoustic profile obtained before the event.

10. A method as claimed in claim 1 wherein processing signals detected by said at least one distributed acoustic sensor interrogator unit comprises detecting an incident P wave by detecting a pattern of disturbances in several discrete sensing portions of at least one optical fibre distributed acoustic sensor.

11. A method as claimed in claim 8 wherein said at least one optical fibre within an optical fibre bundle is an otherwise unused optical fibre in the bundle.

12. A method as claimed in claim 9 wherein the acoustic profile is acquired by integrating the measurement signals from the plurality of discrete longitudinal sensing portions of the fibre over a period of time.

13. A method as claimed in claim 10 including determining the direction of propagation of the P wave, said method comprising providing a plurality of optical fibre distributed acoustic sensor interrogator units, and detecting disturbances in at least two separate optical fibre distributed acoustic sensor interrogator units that relate to propagation of the same seismic wave.

14. A method as claimed in claim 10 comprising estimating the time remaining before arrival of an S body wave.

15. A method as claimed in claim 10 comprising generating one or more alarms when an incident P wave above a certain intensity threshold is detected.

16. A method as claimed in claim 10 further comprising detecting an incident S wave.

17. A method of monitoring for seismic events comprising;

interrogating a plurality of optical fibres with optical pulses so as to provide a plurality of optical fibre distributed acoustic sensors, each optical fibre distributed acoustic sensor producing a measurement signal from each of a plurality of discrete longitudinal sensing portions of said fibre;

monitoring said measurement signals from said plurality of distributed acoustic sensors for seismic activity wherein said plurality of optical fibres are part of an existing communications infrastructure provided for the purpose of communicating data not related to seismic monitoring wherein at least one fibre configured such that at least part of said fibre runs in a different direction to at least part of another fibre; and interrogating at least one further optical fibre with optical pulses so as to provide at least one optical fibre distributed acoustic sensor, wherein said at least one further optical fibre does not form part of said communication infrastructure and which is arranged in a location solely for the purposes of distributed acoustic sensing.

18. A method of monitoring for seismic events comprising interrogating at least one optical fibre with optical pulses so as to provide at least one optical fibre distributed acoustic sensor, each optical fibre distributed acoustic sensor producing a measurement signal from each of a plurality of discrete longitudinal sensing portions of said fibre; and monitoring said measurement signals from said at least one distributed acoustic sensor for seismic activity wherein said at least one optical fibre is part of an existing communications infrastructure provided for the purpose of communicating only data not related to seismic monitoring, wherein monitoring said measurement signals from said at least one distributed acoustic sensor for seismic activity comprises detecting an occurrence of an earthquake and wherein said at least one optical fibre is deployed in an area of interest including a population centre and the method comprises, upon detecting the occurrence of an earthquake, providing an earthquake warning alarm to the population centre.

* * * * *